(12) United States Patent
Jensen

(10) Patent No.: US 6,735,357 B2
(45) Date of Patent: May 11, 2004

(54) MONITORING AND CONTROL OF ALL-OPTICAL CROSS CONNECT FABRICS USING MULTIPLE LASER SOURCES

(75) Inventor: Richard Jensen, Andover, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 153 days.

(21) Appl. No.: 09/882,620

(22) Filed: Jun. 15, 2001

(65) Prior Publication Data
US 2002/0191901 A1 Dec. 19, 2002

(51) Int. Cl.[7] .................................................. G02B 6/28
(52) U.S. Cl. .............................. 385/24; 385/31; 398/30
(58) Field of Search ........................... 385/16, 18, 24, 385/31, 42, 17, 20, 47, 48; 398/30, 92, 157, 201, 19, 31, 33, 38, 12, 93, 94, 95; 250/227.14, 227.19, 227.24

(56) References Cited

U.S. PATENT DOCUMENTS

| | | | |
|---|---|---|---|
| 5,757,526 A | * | 5/1998 | Shiragaki et al. ............ 398/20 |
| 5,867,289 A | * | 2/1999 | Gerstel et al. ............... 398/12 |
| 6,301,402 B1 | * | 10/2001 | Bhalla et al. ................ 385/16 |

* cited by examiner

*Primary Examiner*—Edward J. Glick
*Assistant Examiner*—Therese Barber
(74) *Attorney, Agent, or Firm*—Lahive & Cockfield, LLP (57) ABSTRACT

An active control system and method for controlling the position and/or properties of optical components in an optical switch of an optical communications network is provided. The active control system utilizes a power-sharing scheme to provide an array of supervisory signals, which are directed through the switch to monitor and control the optical components. The supervisory signals are produced by combining the light signals emitted by an array of external light sources, and subsequently splitting the combined signal equally to form the supervisory signals.

25 Claims, 5 Drawing Sheets

MONITORING AND CONTROL OF ALL-OPTICAL CROSS CONNECT FABRICS USING MULTIPLE LASER SOURCES

FIELD OF THE INVENTION

The present invention relates to an optical switch in an optical communications network and more particularly to a control system for monitoring and controlling components of the optical switch.

BACKGROUND OF THE INVENTION

In an optical communications network, optical fibers carry data signals in the form of light waves modulated with information between various locations across the network. In a multi-fiber network, some of the many data signals on individual optical fibers may need to be selectively routed to other fibers. Selective routing may be required, for example, to balance communications traffic, or to avoid an out-of-service leg in the optical network. Such routing can be facilitated by interconnecting the individual optical fibers via a cross-connect switch. Cross-connect switches positioned at particular sites throughout a fiber optic communications network are used to dynamically route information signals from one location to another or to re-configure the network. In conventional cross-connects, optical signals must be converted to electrical form in order to route the signal between different optical fibers. An all-optical cross-connect switch moves optical signals between different optical fibers without the need for an intermediate conversion to electrical signals.

Currently, most types of all-optical switch fabrics, i.e. switches with no optical-to-electrical conversion, require the use of external light sources to monitor and/or control the switch fabric. The external monitors are critical to the operation of the switch fabric and provide feedback regarding the accuracy of the switch fabric in directing the data signals to the appropriate output fibers. For example, many all-optical switch fabric technologies, such as 3D-MEMS (micro electro mechanical machines), 2-D MEMS, liquid crystals, thermo-optics, holograms, liquid gratings and acousto-optics and bubble jets, require external lasers sources to monitor the performance of each light path through the switch. Some technologies, such as 3D-MEMS also require the external laser source to control the alignment of the internal optics in real time. Switches utilizing all-optical technology can potentially comprise up to many thousands of input and output ports. Each port interfaces with a fiber optic cable to direct a data signal carried by the fiber optic cable through or from the switch. Each input port requires a separate external laser source to monitor and control the optical components directing the data signals from the input port to a selected output port of the switch.

MEMS are micron-sized complex machines that have physical dimensions suitable for the fabrication of optical switches for use in communications networks. MEMS switching components generally employ an array of micro-machined steerable mirrors, fabricated on a silicon chip. Control signals applied to the MEMS chip fix the position of each mirror to direct each incoming light signal to a desired output port and output fiber. The mirror-based switches are classified according to the respective mirror movement. In 2-D MEMS switches, the mirrors have only two degrees of freedom of movement: a first degree of movement in up and down movement and a second degree of movement in side to side movement. In 3-D MEMS switches, the mirrors assume a wide variety of positions by swiveling in multiple angles and directions.

A significant disadvantage of the MEMS, in many architectures and other all-optical switches of the prior art concerns the direct association of an external laser source to each input port for monitoring and controlling the optical components of the switch. The conventional external laser source arrangement presents a single point of failure for the entire switch, as the reliability of the switch as a whole depends on the operation of each individual external laser source. When one laser source fails, a supervisory signal will not be transmitted through the corresponding input port, and the operation of the entire switch is unreliable. Consequently, expensive, highly reliable laser sources are a necessity to provide accurate and reliable monitoring and control of MEMS and other all-optical switches.

SUMMARY OF THE INVENTION

The present invention concerns a system and method for monitoring and controlling the components of a node in a communications network. The illustrative embodiment of the invention provides an active control system and method for controlling the position and/or properties of optical components in an optical switch of an optical communications network. The active control system utilizes a power-sharing scheme between an array of external light sources to control the alignment of the internal optical components of a switch in real time. According to the illustrative embodiment, a number of supervisory signals are directed through the switch to measure and regulate the switch components. The supervisory signals are produced by combining the light signals emitted by the array of external light sources, and subsequently splitting the combined signal equally to form the supervisory signals.

The illustrative embodiment of the present invention allows each supervisory signal connection through a switch to equally share the output power of all input sources in an efficient manner. As a result, the switch is tolerant of multiple laser source failures without affecting or disrupting operation. The present invention provides a scalable system and method that can be applied to small or very large all-optical switch fabrics.

According to one embodiment, a control system for monitoring and controlling optical components in a node of an optical network is provided. The control system comprises an array of external light sources configured to emit light signals and a power-sharing coupler connected to the array of light sources. The power-sharing coupler combines the light signals together to create a combined signal and subsequently splits the combined signal into a plurality of supervisory signals. The supervisory signals are utilized to control the optical components in the node.

According to another embodiment, a method of monitoring optical connections in an all-optical switch is provided. The method comprises the steps of providing an array of light sources emitting light signals, combining the light signals to form a combined signal, subsequently separating the combined signal into a plurality of supervisory signals and directing a first supervisory signal from an input port to an output port of the switch.

According to yet another embodiment, an optical switch is provided. The optical switch comprises an input port, an output port and an optical component for directing a data signal from the input port to the output port. The optical switch further includes an array of light sources for providing at least one supervisory laser signal to the node and a power-sharing coupler for combining and dividing the output of the array of light sources to form the at least one supervisory signal.

According to a final embodiment, a power-sharing coupler for directing supervisory signals through an optical switch in order to control optical components in the switch is provided. The power-sharing coupler comprises an intake manifold and a distribution manifold. The intake manifold combines a plurality of input light signals from a plurality of light sources into a combined signal. The distribution manifold splits the combined signal into a plurality of supervisory signals for monitoring the alignment of the optical components.

BRIEF DESCRIPTION OF THE DRAWINGS

The foregoing and other features and advantages of the invention will be apparent from the following description and apparent from the accompanying drawings.

FIG. 3b illustrates an alternate embodiment of the feedback control system of FIG. 3a.

DETAILED DESCRIPTION

The illustrative embodiment of the present invention provides a system and method for controlling the position and alignment of optical components in an optical switch of an optical communications network. The illustrative embodiment involves a power-sharing scheme for a feedback control system to increase the reliability of the optical switch. The present invention will be described below relative to an illustrative embodiment in a micro electro mechanical (MEMS) optical cross-connect switch in an optical communications network. Those skilled in the art will appreciate that the present invention may also be implemented in a wide variety of all-optical switch fabric technologies, including, but not limited to liquid crystals, thermo-optics, holograms, liquid gratings, acousto-optics and bubble jets.

Figure 1:
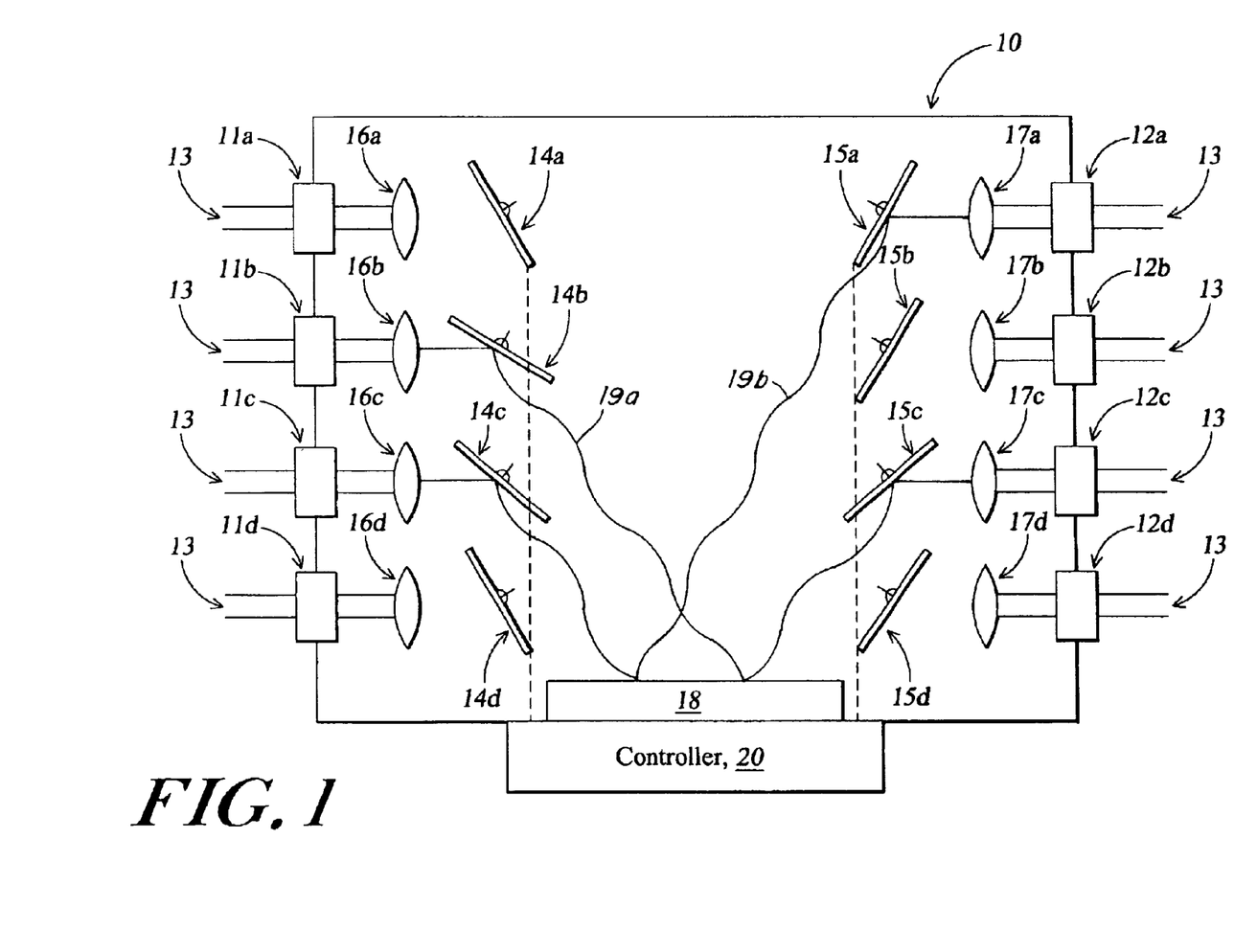
FIG. 1 illustrates a micro electro mechanical optical cross-connect switch suitable for employing the illustrative embodiment of the invention.

FIG. 1 is a cross-sectional view of an optical cross-connect switch 10 in an optical communications network suitable for implementing the illustrative embodiment of the invention. An optical cross-connect switch comprises any device that can switch optical signals between different optical fibers, without the need for conversion to electrical signals. The illustrated switch 10 comprises an integrated microsystem on a chip incorporating moving mechanical parts and fabricated using 3-D MEMS technology. For the purposes of simplicity, the illustrated switch 10 comprises a four-by-one matrix of micromachined mirrors for switching optical data signals between four input optical fibers and four output optical fibers. Those skilled in the art will recognize that any suitable number of cross-connects and other optical components may be used. For example, the optical cross-connect switch can comprise up to hundreds of thousands of mirrors for switching incoming optical signals to a corresponding number of output fibers.

The illustrated switch 10 includes input ports 11a, 11b, 11c, 11d and output ports 12a, 12b, 12c, 12d. Data signals enter the optical switch 10 through the input ports and exit the node through the output ports. Trunks 13 comprise fiber optic cable carrying data signals in the form of light pulses. The trunks 13 interface with the node via the ports to provide connections to adjacent nodes in the network.

The switch fabric of the illustrated optical switch 10 includes an array of miniature steerable mirrors for directing optical signals from one path to another. Input mirrors 14a, 14b, 14c, 14d are positioned to receive optical data signals from input ports 11a, 11b, 11c, 11d, respectively. The mirrors are arranged on pivots so that they can be moved in three dimensions to switch each optical data signal from an input port to a desired output port. An input converging lens 16a positioned adjacent to the end of an input fiber optic cable focuses the incoming optical signal from port 11a onto input mirror 14a. Input converging lenses 16b, 16c, 16d similarly focus incoming optical signals from corresponding ports onto corresponding input mirrors. The input mirrors reflect each received optical signal to a flat mirror 18, which in turn reflects the optical signals to the desired output port, depending on the angle and point of reflection of each incoming optical signal from the respective input mirror. Output mirrors 15a, 15b, 15c, 15d receive the reflected optical signals, and reflect each received optical signal to a corresponding output lens, 17a, 17b, 17c, 17d, respectively. The output lenses 17a, 17b, 17c, 17d focus and direct each respective received optical signal to an output fiber optic cable interfacing with output ports 12a, 12b, 12c and 12d, respectively. The optical signals then propagate through the output fiber optic cable to another node in the network.

The position of the input mirrors determines the path of each received optical signal through the switch. In the illustrated 3-D switch, the mirrors 14, 15 assume a wide variety of positions by pivoting in multiple angle and directions. A controller 20 supplies control signals to fix the position of each individual input and output mirror to determine the path and destination of each incoming optical signal directed to the mirror. According to the illustrative embodiment, the mirrors are formed of an electrically conductive material, and the controller 20 applies an electric field to position the mirrors. One skilled in the art will recognize that the control signal may alternatively comprise other suitable control signals. For example, according to an alternate embodiment, the mirrors are formed of magnetic materials, and the controller applies a magnetic field to move and position the mirrors. In the absence of an active control signal from the controller 20, the mirror components in the optical switch 10 fall to an inoperative position.

In the illustrated switch 10, a first optical data signal carrying information through the network is transmitted along data path 19a through the node. The first optical signal passes through the input port 11b and input lens 16b to input mirror 14b. The input mirror 14b is precisely positioned and locked into place by the controller 20 to direct the incoming data signal to output mirror 15c via the flat mirror 18. The output mirror 15c is precisely positioned by the controller to reflect the first signal received from the flat mirror 18 to output lens 17c, which directs the first signal through output port 12c. A second optical data signal carrying information through the network is transmitted along data path 19b through the node. As illustrated, the second data signal is received by input mirror 14c and propagates along the data path 19b, which is determined by the position and angle of mirror 14c. The second signal is received by flat mirror 18 and reflected to output mirror 15a, which directs the second signal to output lens 17a, and finally through output port 12a. From output ports 12a and 12c, the respective data signals propagate through the optical communications network to a final destination.

As illustrated, the position and angle of the mirror components determine the direction and route of an incoming data signal. The controller 20 precisely positions each input mirror to switch an incoming data signal to a desired output port. Each output mirror must be accurately positioned to receive a data signal from a corresponding input mirror and direct the data signal through an output port. The precise alignment and positioning of the mirrors in the switch are crucial to the operation of the optical switch, as even a seemingly minor skew could cause information carried by a data signal to be lost or misdirected. According to an alternate embodiment, the shape of the mirrors determines the direction and route of the incoming data signal. The controller 20 applies control signals to modify the shape of the mirror in order to change the direction and route of the data signal.

To monitor and control the operation of the switch, an external light source is utilized to measure the accuracy of the optical components, i.e. the mirrors, in directing signals from an input port to an output port. The external light source produces supervisory signals, which are injected into the various data paths of the switch. The supervisory signals provide feedback to the controller 20 indicative of the accuracy of the switch fabric in directing light through the switch. According to the illustrative embodiment, a power-sharing scheme is utilized to provide supervisory signals for monitoring and controlling the alignment of the optical components in the 3-D MEMS switch 10.

Figure 2:
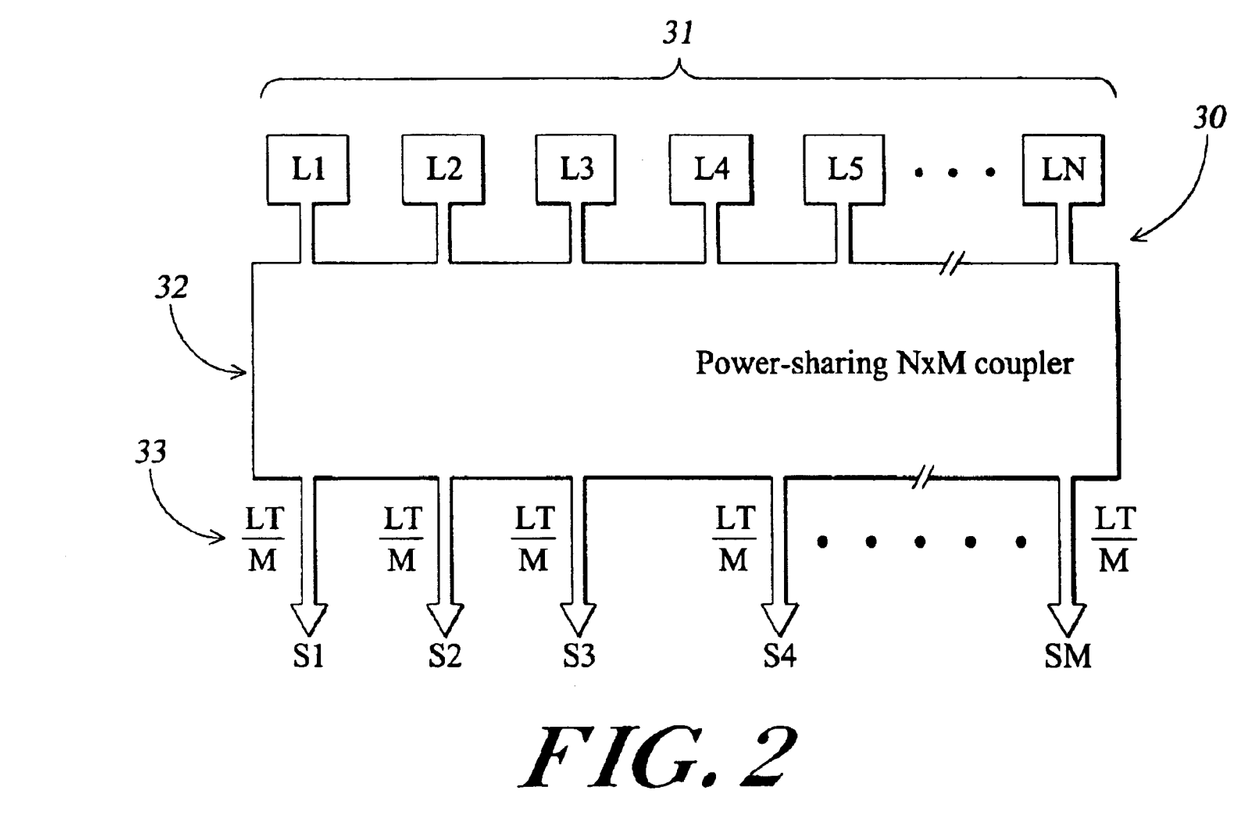
FIG. 2 illustrates a power-sharing scheme according to the illustrative embodiment of the invention for providing supervisory signals to monitor and control the switch components of the optical switch illustrated in FIG. 1.

FIG. 2 illustrates the external light source arrangement 30 of the illustrative embodiment for monitoring and controlling the switch fabric. The illustrated external light source arrangement 30 employs a power-sharing scheme. The external light source arrangement 30 includes an array of light sources 31. The illustrated array 31 comprises N lasers, L1 through LN, emitting light signals suitable for monitoring the optical components of a switch. The lasers L1 through LN in the array 31 are coupled to a power-sharing coupler 32. The power-sharing coupler 32 combines the outputs of the lasers into a combined signal and subsequently splits the combined signal using passive optics. As illustrated, the output 33 of the power-sharing coupler 32 comprises M individual supervisory signals S1 through SM, each of which may be directed to an input port of an optical switch to measure the accuracy of the switch components. The power-sharing coupler 32 distributes the output of each laser source in the array 31 equally among the separate supervisory signals. The combined signal has an optical power $L_T$ equaling the sum of the power of the light signals emitted by the laser sources $L_1$ through LN. The combined signal power $L_T$ is shared equally among the separate supervisory signals S1 through SM, such that each supervisory signal has an optical power of $L_T/M$.

The combining and subsequent splitting of the laser light signals can be accomplished through a variety of passive methods. For example, according to one embodiment, the power-sharing coupler comprises combinations of passive two-input couplers for combining the light signals from the array of laser sources in a distributed manner. According to an alternate embodiment, the power-sharing coupler comprises a single M-by-N coupler, including an intake manifold for gathering several light signal inputs into one combined output signal and a distribution manifold for splitting the combined output signal into several outputs. Those skilled in the art will recognize that a variety of arrangements and configurations may be utilized to combine and distribute light signals from the array of light sources.

Figure 3A:
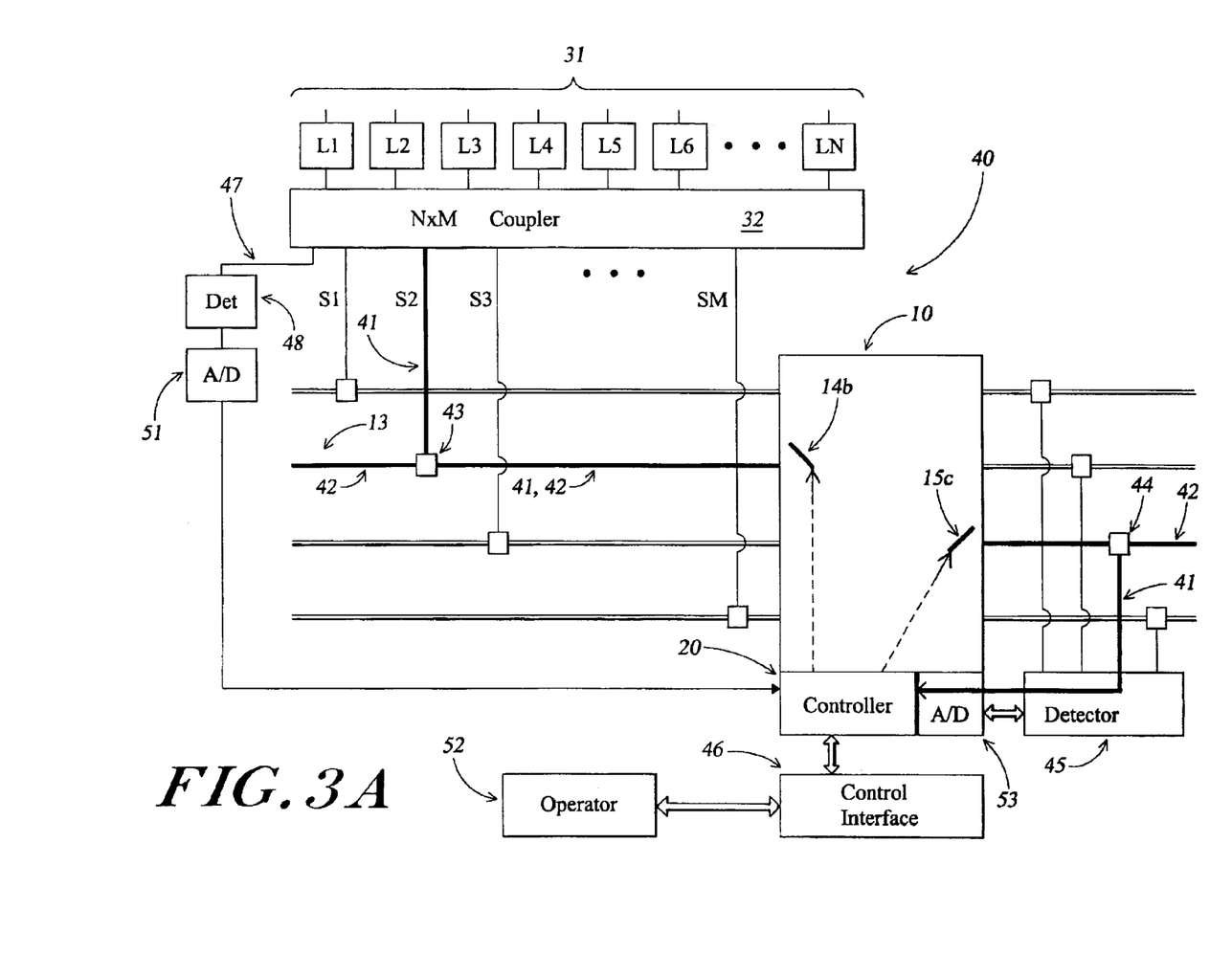
FIG. 3a illustrates a feedback control system suitable for controlling the alignment of the switch fabric and implementing the power-sharing scheme illustrated in FIG. 2.

FIG. 3a illustrates a closed loop feedback control system applied to the 3-D MEMS optical switch 10 of FIG. 1 according to the illustrative embodiment of the invention. As illustrated, the feedback control system 40 utilizes the power-sharing scheme described above and illustrated in FIG. 2. The supervisory signals S1 through SM produced by the power-sharing coupler 32 are injected into the data path of the data signals transmitted through the switch 10 to measure the accuracy of the switch components along the data path. The control system will be described by tracking the route of one of the supervisory signals produced by the power-sharing coupler 32. It is understood that other supervisory signals produced by the power-sharing coupler are also directed to different data signal paths to monitor and correct inconsistencies and/or inaccuracies in the optical components along all data paths through the switch. The illustrated power-sharing coupler 32 produces a supervisory signal for every input port and data path through the optical cross-connect switch 10.

According to the illustrative embodiment, the wavelengths of the light signals emitted by the N lasers in the light source array are outside the wavelength band of the high-speed data signals carrying data through the switch, allowing the supervisory signals to propagate along the same light path as the data signals without disrupting or interfering with the data transmitted through the network. In addition to preventing disruption and/or interference of data, the out-of-band wavelengths of the supervisory signals facilitate the transmission and detection of the supervisory signals through the switch, as will be described below.

As illustrated and discussed, the power-sharing coupler 32 combines and subsequently splits the light from an array of lasers into an array of supervisory signals. A supervisory signal 41 is directed to a fiber optic cable 13 carrying a high-speed data signal 42 through an optical network to the optical switch 10. An input coupler 43 combines the supervisory signal 41 with the high-speed data signal 42 in order to transmit the supervisory signal through the switch 10. The supervisory signal is guided along the same data path though the switch as the high speed data signal 42. An output coupler 44 placed adjacent to the output port separates the supervisory signal 41 from the data signal 42 and directs the supervisory signal 41 to a detector 45. According to the illustrative embodiment, the output coupler 44 comprises a wavelength selective coupler to target wavelengths in the range of the supervisory signal, while allowing the high speed data signal to pass through unaffected. The detector 45 detects the supervisory signal from the node and generates an output signal indicative of the detected supervisory signal. The detector 45 passes the detected supervisory signal to the controller 20. The controller includes an A/D converter 53 to convert the output supervisory signal from analog form to digital form. In response to the measured supervisory signal from the detector 45, the controller 20 adjusts the mirrors directing the data signals and supervisory signals through the node by adjusting the control signals applied to the mirrors. The controller adjusts the mirrors to correct misalignment or error along the data paths in real time, i.e. concurrently with the routing of data signals through the switch, to ensure that the switch properly routes the data signals between different optical fibers.

The illustrative system 40 further includes a control interface 46 for an operator 52 to manually control the position of the mirror components in the optical switch 10. The operator 52 manages the control interface 46 to establish the relationships between different components and construct the data paths through the switch 10.

The health and output power of the entire N-laser array 31 can be monitored, if desired, by measuring the output of one of the supervisory signals from the power-sharing coupler. According to the illustrative embodiment, one of the output signals from the power-sharing coupler comprises a power tap 47 for monitoring the state of the external supervisory lasers in the light source array 31. The power tap 47 is feed to a power detector 48, which measures the total power output by the array 31. A drop in the total power indicates failure of one or more lasers. Depending on the magnitude of the loss, the number of failed lasers can be determined. The power tap is supplied to an A/D converter 51 and forwarded to the controller 20. The controller 20 utilizes the strength of the power tap signal 47 as a basis for evaluating the detected supervisory signals.

The power-sharing scheme significantly increases the reliability and functionality of the illustrated control system. The control system is tolerant of failures of individual lasers in the light source array without compromising the capability of the system to monitor and control the switch fabric. The control system accurately monitors and controls the optical components independent of the functioning of the individual lasers. When a portion of the lasers fail, the power-sharing scheme continues to provide a sufficient supervisory signal to each input port in the switch, because each supervisory signal is a product of the combined power of all of the input lasers. Thus, failure of individual lasers has little effect on the control system as a whole.

Figure 3B:
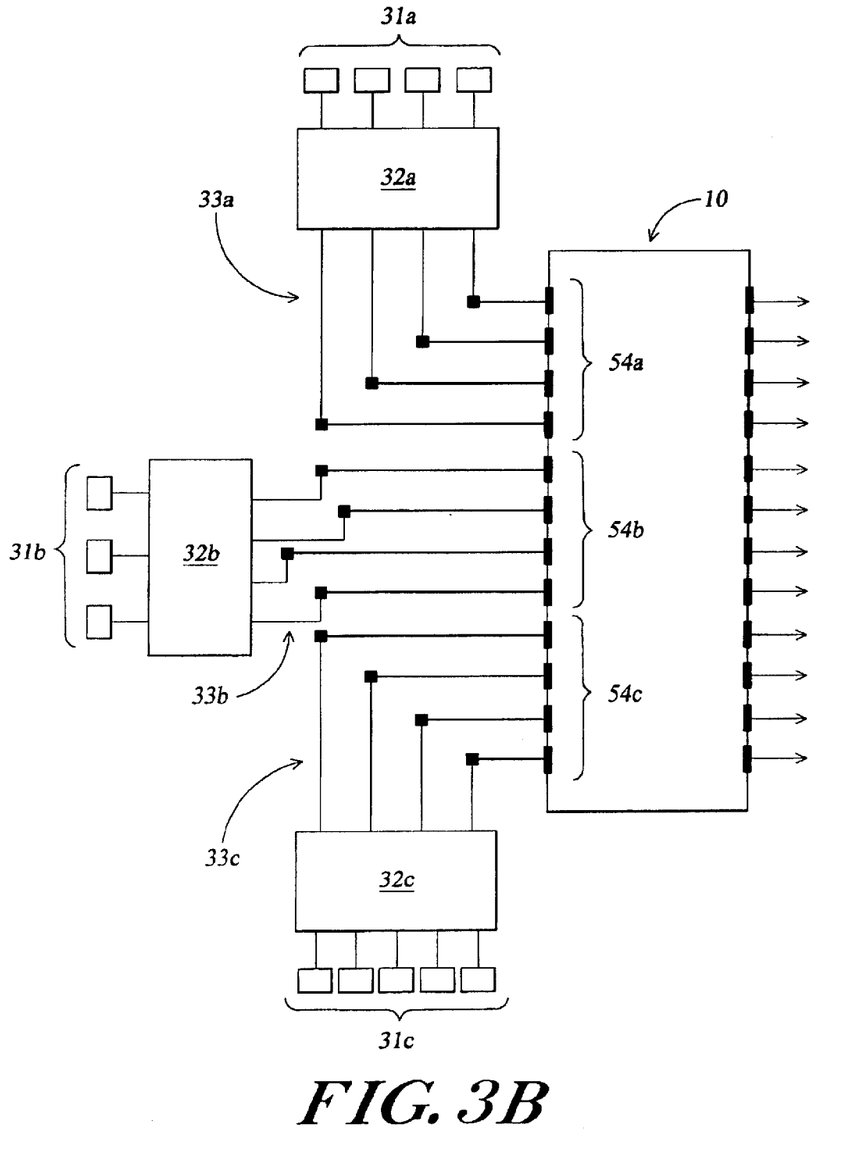

FIG. 3b illustrates another embodiment of the power-sharing scheme, wherein a plurality of power-sharing couplers is utilized for a single optical switch. For example, in the illustrated switch 10' having a large number of ports, the ports of the switch are divided into power-sharing subgroups 54a, 54b and 54c. Each power-sharing subgroup 54a, 54b, 54c has associated therewith a light source array 31a, 31b, 31c, respectively, a power-sharing coupler 32a, 32b, 32c, respectively and a distributed supervisory signal array 33a, 33b, 33c, respectively. Each power-sharing coupler 32a, 32b, 32c combines and splits the light signals from the corresponding light source array 31a, 31b, 31c to provide a shared supervisory signal for each port in the associated subgroup 54a, 54b, 54c, respectively. One skilled in the art will recognize that the number and size of the power-sharing subgroups, the number and power of the lasers in the light source array and the number and power of the supervisory signals generated from the lasers will vary according to different applications.

Figure 4:
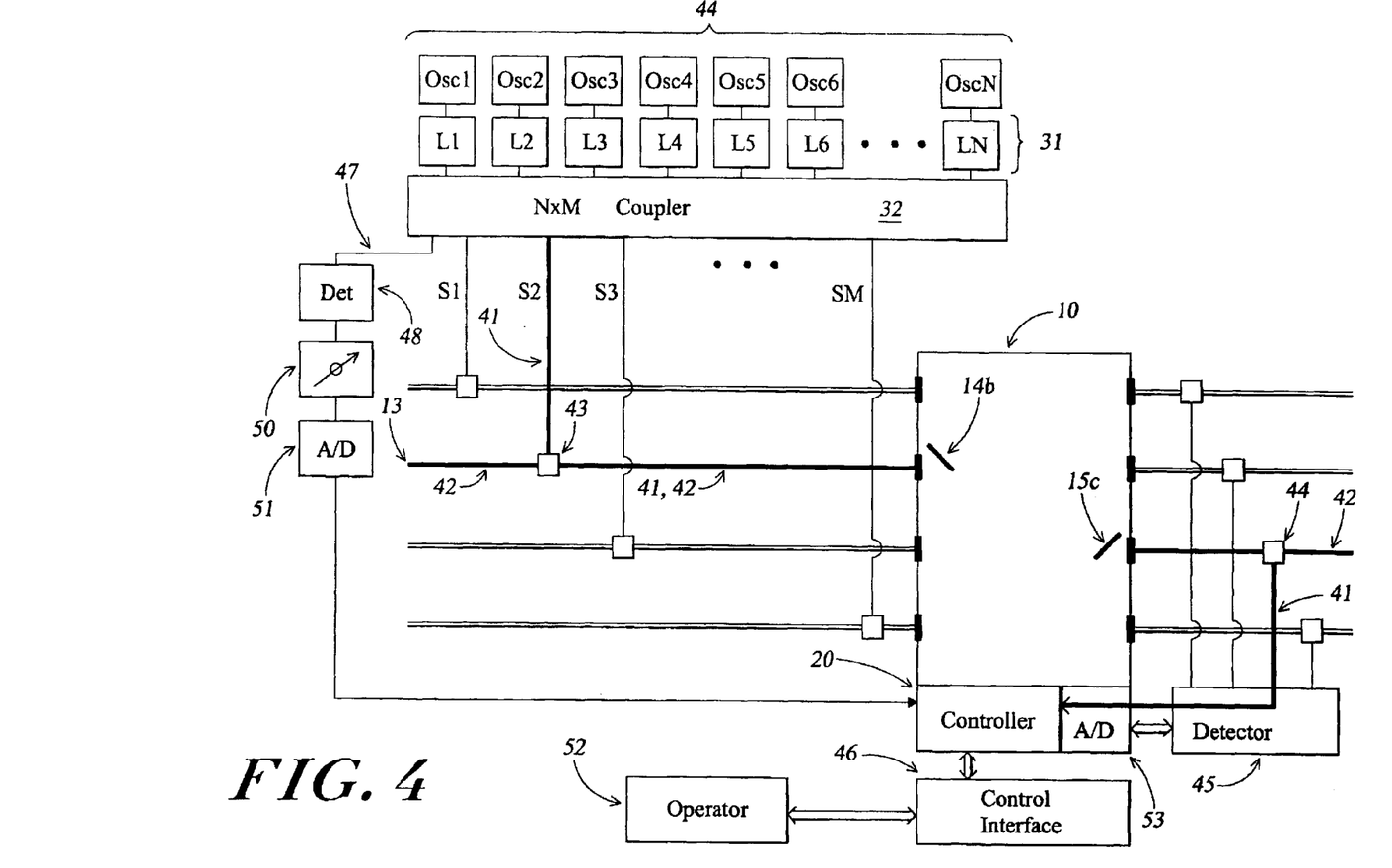
FIG. 4 illustrates an alternate embodiment of the feedback control system of FIG. 3a, including oscillators to monitor an array of light sources.

FIG. 4 illustrates the closed loop feedback control system according to an alternate embodiment of the invention. The system of FIG. 4 incorporates the features of the system illustrated in FIG. 3a, and further provides a monitoring system for the laser array 31. According to the illustrated embodiment, each laser is connected to an oscillator $Osc_1$ through $Osc_N$ in an oscillator array 49. Each oscillator operates at a predetermined frequency and modulates the light signals from the lasers, such that each light signal emitted by the laser array 31 has a different frequency. As described above, the power tap signal 47 is directed to the detector 48, which indicates whether any of the lasers in the array have failed. A tunable filter 50 may be utilized to identify which lasers are operating and which lasers are not operating. To identify the state of each laser, the tunable filter frequency is varied to track the frequencies of the oscillators in the oscillator array 49. For example, if the power tap signal 47 indicates that one of the lasers has failed (i.e. is not emitting a light signal or is emitting a weak light signal), the operator 52 can sequentially examine the output of each laser in the array 31 by sequentially tuning the filter 50 to the various frequencies of the oscillators in the oscillator array 49 and monitoring the output from the filter 50. For example, if oscillator $OSC_3$ operates at a frequency $F_3$, and the tunable filter 50 is tuned to pass only frequency $F_3$, the operator can determine whether the laser L3 in the light source array 31 is operating by detecting the output signal from the tunable filter. In this manner, an operator can easily identify and service any non-operating lasers in the light source array 31.

The power-sharing scheme of the illustrative embodiment significantly increases the reliability of an optical switch while reducing the cost associated with manufacturing, operating and servicing the switch. The power-sharing scheme of the illustrative embodiment provides significant improvements over conventional optical/electronic control circuits and mechanical switching techniques, which directly associate a supervisory laser to an input port. When a supervisory laser in a conventional control system fails, a supervisory signal will not be provided to the associated input port and data path of the node, causing the operation of the optical components along that data path to be unreliable. As the reliability and performance of each supervisory laser in these conventional systems are crucial to the operation of the switch as a whole, expensive and highly reliable lasers are a necessity.

However, the illustrative embodiment of the present invention provides a reliable control system regardless of the reliability and performance of each individual laser. The generation of an array supervisory signals that divide and equally share in the output of an array of lasers allows each of the supervisory signals to be tolerant to failures of any one of the lasers. For example, if half of the input lasers fail, each of the supervisory signals produced by the power-sharing scheme continues to operate with one half the optical power, sufficient to monitor and control all of the switch components. In applications where maintaining the supervisory laser source power within some range is critical, such as in many all-optical switch applications, the illustrative embodiment of the invention provides an efficient, highly reliable method for monitoring and controlling a large number of connections.

As a result of the reduced importance of the individual reliability of each individual supervisory laser, the cost of manufacturing, operating and servicing the switch is appreciably reduced. In the conventional control systems, high reliability is mutually exclusive of low cost, as expensive, reliable lasers must be used to provide high reliability, while less expensive lasers tend to be less reliable. However, the illustrated power-sharing scheme tolerates less reliable (i.e. less expensive) lasers while continuing to provide high reliability. Supervisory lasers for the illustrated control system can be selected based on other factors, such as cost, rather than solely based on reliability.

Furthermore, since the power-sharing scheme is completely passive, no monitoring, control or switching is needed to implement the illustrative embodiment. The power-sharing scheme is completely automatic, easy to install and requires no intervention. A further advantage of the power-sharing scheme of the invention is that maintenance on the laser sources can be done while the switch fabric is in-service without affecting switch operation. The operator can identify and service any non-operating lasers in the light source array without disrupting the routing of data through the switch, or disrupting the supervisory signals supplied to monitor and control the switch.

The present invention is not limited to the illustrated configuration and application of the present invention. For example, those skilled in the art will recognize that while the invention has been described relative to an implementation in a 3-D MEMS switch, the illustrated power-sharing scheme is not limited to a 3-D MEMS switch and can be utilized for and applied to any component of a communications network requiring an external light source to monitor and control the component.

The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

Having described the invention, what is claimed as new and protected by Letters Patent is:

What is claimed is:

1. A feedback control system for monitoring and controlling a component in an optical node of an optical network, comprising:
    an array of external light sources configured to emit light signals; and
    a power-sharing coupler connected to the array of light sources for combining the light signals together to create a combined signal and subsequently splitting the combined signal into a plurality of supervisory signals for controlling said component.

2. The control system of claim 1, wherein the power of the combined signal is distributed equally among the supervisory signals.

3. The control system of claim 1, wherein the node includes an input port and wherein at least one of the supervisory signals is directed to the input port of the node.

4. The control system of claim 1, further comprising:
    an input communications channel for carrying a first data signal to an input port of the node, and
    an input coupler for combining a first supervisory signal with the first data signal in said input communications channel to transmit the first supervisory signal through said input port.

5. The control system of claim 4, wherein the wavelength of the first supervisory signal is different than the wavelength of the first data signal to prevent interference between the first supervisory signal and the first data signal.

6. The control system of claim 4, further comprising a monitoring component, wherein the component of the optical node transmits said first data signal and said first supervisory signal along a first data path through the node, and wherein said monitoring component utilizes said first supervisory signal to monitor the accuracy of the first data path.

7. The control system of claim 4, further comprising an output coupler for separating said first supervisory signal from said first data signal after said first supervisory signal exits the node.

8. The control system of claim 7, wherein said output coupler directs said first supervisory signal to a detector for detecting the signal and providing feedback to a controller for controlling the position of said component.

9. The control system of claim 8, wherein said detector converts said first supervisory signal to an electrical signal and forwards said electrical signal to the controller for controlling said component.

10. The control system of claim 1, further comprising a controller for adjusting said component in response to a supervisory signal.

11. The control system of claim 1, further comprising a detector for detecting a supervisory signal.

12. The control system of claim 1, wherein the node comprises a plurality of input ports and the power-sharing coupler provides a supervisory signal for each of the input ports in the node.

13. The control system of claim 1, wherein said component of the optical nodes comprises a plurality of mirrors, and each mirror directs a data signal along a data path between an input port and an output port of the node.

14. The control system of claim 13, wherein a supervisory signal is transmitted along each of said data paths.

15. The control system of claim 13, further comprising:
    a detector for detecting said supervisory signals; and
    a controller for controlling the position of said mirrors in response to said supervisory signals.

16. The control system of claim 1, further comprising a power tap for monitoring the external array of light sources, wherein said power tap directs one of said supervisory signals to a supervisory detector to detect a failure of a light source.

17. The control system of claim 16, further comprising a plurality of oscillators connected to said array of external light sources to modulate said light signals.

18. The control system of claim 17, wherein said power tap further comprises a tunable filter to identify one of said light sources in said array of external light sources that has failed.

19. The control system of claim 1, wherein the node comprises a plurality of input ports divided into several power-sharing subgroups, and the power-sharing coupler provides a supervisory signal for each of the input ports in a first power-sharing subgroup.

20. The control system of claim 19, further comprising a second array of external light sources and a second power-sharing coupler connected to the second array of light sources for providing a supervisory signal for each of the input ports in a second power-sharing subgroup.

21. A feedback control system for monitoring and controlling optical components in a node of an optical network, wherein the node includes a first power-sharing subgroup and a second power-sharing subgroup of optical components, the feedback control system comprising:
    a first array of external light sources configured to emit a first set of light signals; and
    a first power-sharing coupler connected to the first array of light sources for combining the first set of light signals together to create a first combined signal and subsequently splitting the first combined signal into a plurality of first supervisory signals for controlling said optical components in said first power-sharing subgroup;
    a second array of external light sources configured to emit a first set of light signals; and
    a second power-sharing coupler connected to the second array of light sources for combining the second set of light signals together to create a second combined signal and subsequently splitting the second combined signal into a plurality of second supervisory signals for controlling said optical components in said second power-sharing subgroup.

22. A feedback control system for monitoring and controlling one or more components of an optical node of an optical network, comprising:

an array of external light sources configured to emit light signals;

a power-sharing coupler connected to the array of light sources for combining the light signals together to create a combined signal and subsequently splitting the combined signal into a plurality of supervisory signals for controlling said optical components;

an input communications channel for carrying a first data signal to an input port of the node, and an input coupler for combining a first supervisory signal with the first data signal in said input communications channel to transmit the first supervisory signal through said input port.

23. A feedback control system for monitoring and controlling one or more components of an optical node of an optical network, comprising:

an array of external light sources configured to emit light signals;

a power-sharing coupler connected to the array of light sources for combining the light signals together to create a combined signal and subsequently splitting the combined signal into a plurality of supervisory signals for controlling said optical components; and a power tap for monitoring the external array of light sources, wherein said power tap directs one of said supervisory signals to a supervisory detector to detect a failure of a light source.

24. A feedback control system for monitoring and controlling one or more components of an optical node of an optical network, comprising:

an array of external light sources configured to emit light signals; and a power-sharing coupler connected to the array of light sources for combining the light signals together to create a combined signal and subsequently splitting the combined signal into a plurality of supervisory signals for controlling said optical components, wherein the node comprises a plurality of input ports divided into several power-sharing subgroups, and the power-sharing coupler provides a supervisory signal for each of the input ports in a first power-sharing subgroup.

25. A feedback control system for monitoring and controlling a component in an optical node of an optical network, comprising:

an array of external light sources configured to emit an array of light signals having a combined optical power; and a power-sharing coupler connected to the array of light sources for combining the light signals together to create a combined signal and subsequently splitting the combined signal into a plurality of supervisory signals for controlling said component, wherein each supervisory signal shares equally in the combined optical power from the array of external light sources.

* * * * *